E. F. BUBB.
TRANSMISSION CONE GEARING APPARATUS.
APPLICATION FILED JUNE 24, 1914.
1,156,883.
Patented Oct. 19, 1915.
2 SHEETS—SHEET 2.
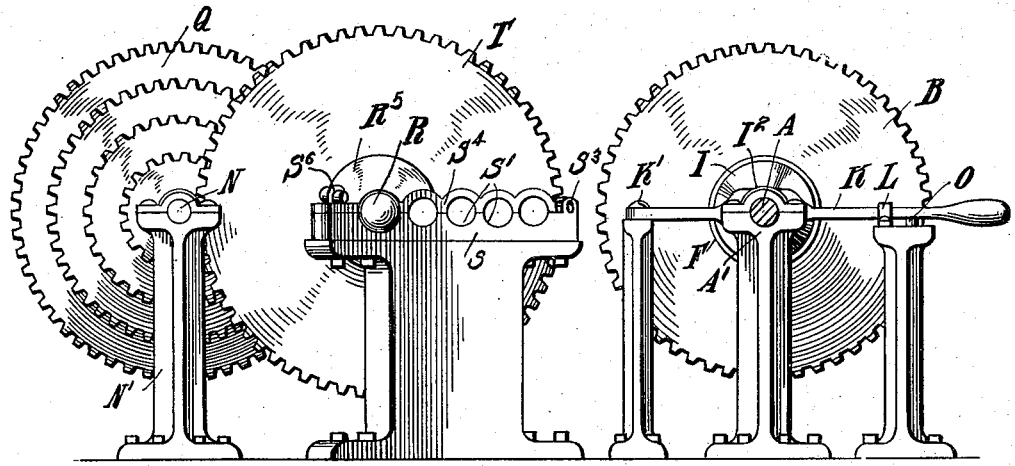
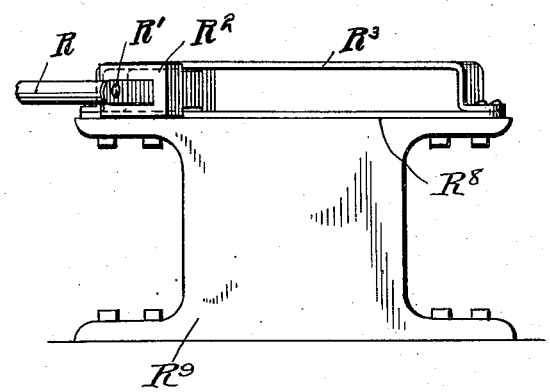
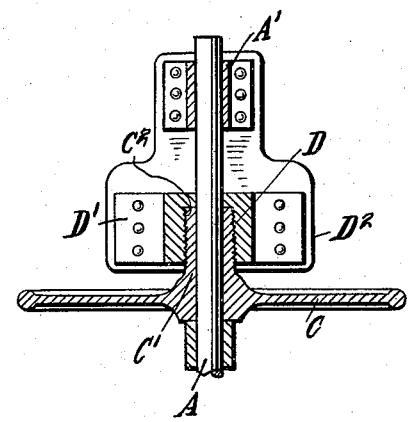
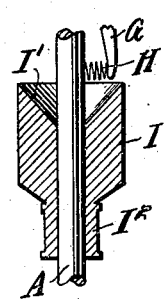
Inventor
Elmer F. Bubb,

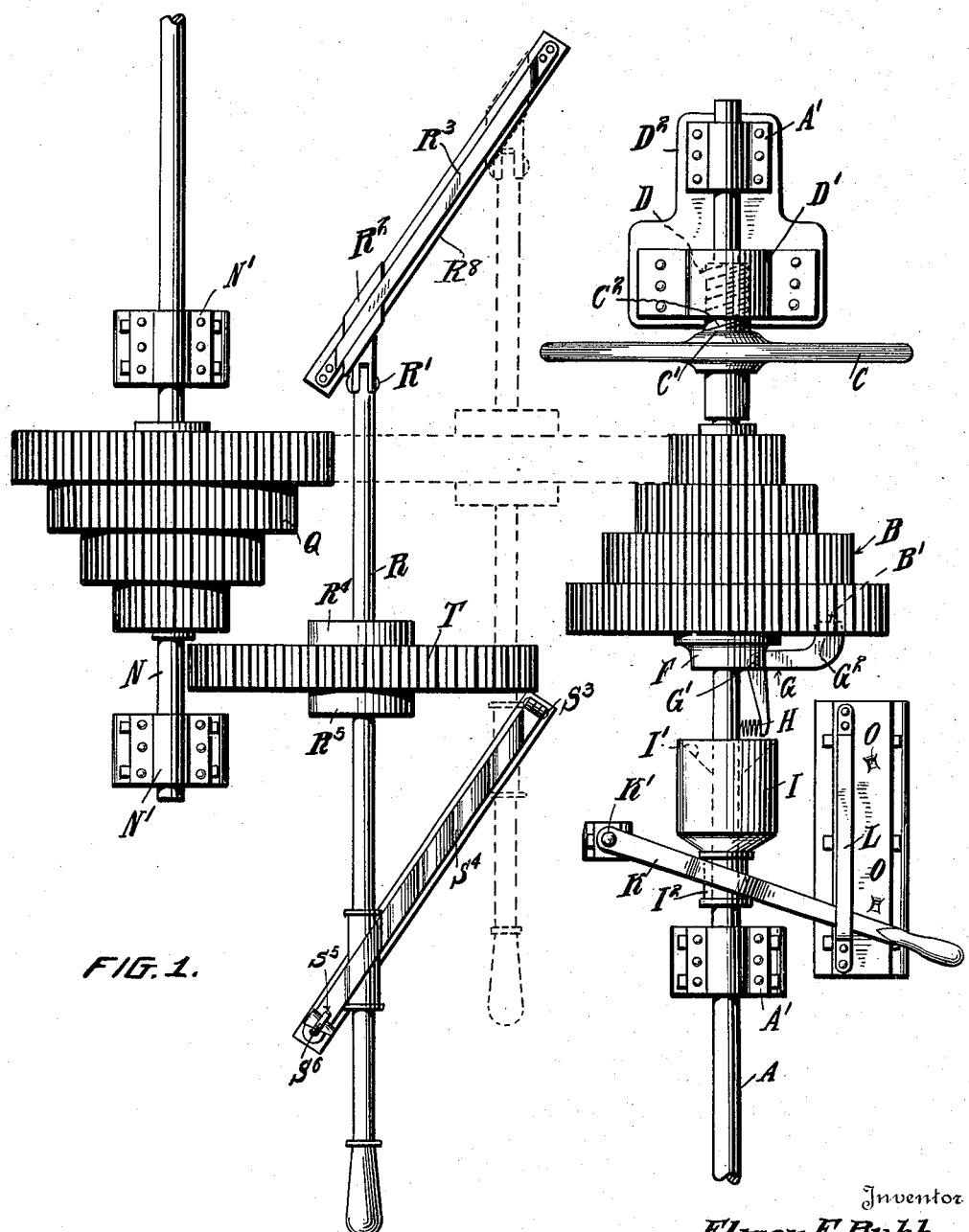

UNITED STATES PATENT OFFICE.

ELMER F. BUBB, OF CHICAGO, ILLINOIS.

TRANSMISSION-CONE-GEARING APPARATUS.

1,156,883.  Specification of Letters Patent.  Patented Oct. 19, 1915.

Application filed June 24, 1914. Serial No. 847,110.

*To all whom it may concern:*

Be it known that I, ELMER F. BUBB, a citizen of the United States, residing at Chicago, in the county of Cook and State of Illinois, have invented certain new and useful Improvements in Transmission-Cone-Gearing Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in transmission cone gearing apparatus and comprises a simple and efficient mechanism of this nature having various details of construction, combinations and arrangements of parts which will be hereinafter fully described, shown in the accompanying drawings and then specifically defined in the appended claims.

My invention is illustrated in the accompanying drawings, in which:—

Figure 1 is a top plan view of my cone transmission apparatus, parts being shown in section. Fig. 2 is a side elevation, and Figs. 3, 4 and 5 are detail views of parts of the mechanism.

Reference now being had to the details of the drawings by letter, A designates a driving shaft journaled in suitable bearings $A'$, and B designates a stepped cone wheel loosely journaled thereon.

C designates a hand wheel having an integral collar $C'$ thereon having circumferential threads $C^2$ and which are adapted to engage the interior threads D formed within the shell $D'$ which is fastened stationary to the plate $D^2$.

F designates a collar which is fixed to the shaft A, and G designates an angle lever pivotally mounted upon a pin $G'$ carried by the collar F, and H is a coiled spring bearing between the shaft A at one end of the lever G and tending to hold the opposite end $G^2$ within a recess $B'$ formed in the face of the cone wheel B.

Mounted loosely upon the shaft A and having a longitudinal movement thereon is a clutch pulley I, one end $I'$ of which is recessed, having a tapering wall adapted, as the member I is moved in one direction, to contact with the angle lever G to tilt the same. Said clutch pulley has a contracted portion $I^2$ engaged by the forked lever K which is pivotally mounted upon a pin $K'$.

L designates a guide bar which is slotted for the reception of the lever K, and O, O designate buttons which are adapted to engage the lever K to hold the same at its limit in one direction or the other.

A counter shaft N is journaled in suitable bearings $N'$ and a second stepped cone Q is fixed to the shaft N, the steps of the two cones B and Q being arranged opposite each other, as shown in Fig. 1 of the drawings, in order to obtain a variation in the speed of the driven shaft N.

A shaft R is pivotally connected at $R'$ to a link $R^2$ which is guided in its movements by the strap $R^3$ engaging a recess in said block, said block also being recessed upon its under surface to engage over the top $R^8$ of the standard $R^9$, and said shaft R has two fixed collars $R^4$ and $R^5$ thereon, spaced apart and adjacent to the loosely mounted gear wheel T which is used for transmitting motion from one cone gear to the other in one or the other of the series of stepped portions thereof accordingly as it may be desired to vary the speed to be transmitted to the driven shaft. A plate S, having grooves $S'$ in the upper edge thereof and corresponding to each pair of stepped portions of the cones, is fixed in diagonal relation to the length of the shaft R and in one or the other of which grooves the shaft R is adapted to be held accordingly as it may be desired to throw the wheel T intermediate one or another of the two oppositely disposed steps of the cones.

A bar $S^4$ is pivotally mounted on a pin $S^3$ at one end of the plate S and its other end is slotted as at $S^5$ to receive the staple $S^6$, affording means for locking the shaft in an adjusted position.

In operation, it being understood that the shaft A is driven from any suitable source of power and constantly in rotation, the initial rotary movement is imparted to the cone B by turning the hand wheel C which will move the end of the cone B frictionally in contact with the rotating collar F, thus causing the cone to rotate therewith and forming means for starting the rotary movement of the cone gearing gradually, after which the lever K may be thrown away from the cone wheel B, causing the clutch member I to release the angle lever G to allow the end thereof G² to engage the notch or recess B' in the face of the cone gear, thus forming a positive means for causing the cone to rotate with the shaft, after which the wheel C may be rotated to throw the hub portion thereof out of engagement with the opposite end of the cone gearing. In the event of it being desired to transmit the fastest rotary movement to the counter shaft N, the operator by taking hold of the handle end of the shaft R may move the same to cause the gear wheel T to be interposed between the stepped portion of largest diameter of the cone B and the stepped part of least diameter upon the cone wheel Q. When the wheel T is thus adjusted, the free end of the shaft R would rest in the groove at the extreme left end of the plate S and would be retained therein through the medium of the lever S⁴, thus locking the parts securely together. If other speeds are desired, the wheel T may be correspondingly adjusted to the various corresponding stepped portions upon the two cone wheels.

It will be noted that in the various adjustments of the shaft R, it will be always held in parallel relation with the driving and counter shafts.

By the provision of a transmission gear mechanism as shown and described, it will be noted that varying speeds may be obtained to the driven shaft and the mechanism started and stopped gradually without any jerking or jarring to the various parts of the apparatus.

What I claim to be new is:—

1. A double cone transmission gear mechanism comprising a driven and a driving shaft, a speed cone fixed to the driven shaft and a loosely mounted cone upon the driving shaft, a collar fixed to the driving shaft, a pivotal member rotating with the driving shaft, means for throwing the same into engagement with the loosely mounted cone thereon, a transmission shaft and gearing loosely mounted thereon, and means for moving the transmission shaft intermediate the speed cones.

2. A double cone transmission gear mechanism comprising a driven and a driving shaft, a speed cone fixed to the driven shaft and a loosely mounted cone upon the driving shaft, a collar fixed to the driving shaft, a pivotal member rotating with the driving shaft, means for throwing the same into engagement with the loosely mounted cone thereon, a transmission shaft and gearing loosely mounted thereon, means for moving the transmission shaft intermediate the speed cones, and means for locking the transmission shaft in different positions.

3. A double cone transmission gear mechanism comprising a driven and a driving shaft, a speed cone fixed to the driven shaft and a loosely mounted cone upon the driving shaft, a collar fixed to the driving shaft, a spring-pressed member pivotally mounted thereon, a clutch member for engagement with said pivotal member, the latter being adapted to engage a recess in the cone upon the driving shaft, means for moving the cone upon the driving shaft in frictional contact with said collar to impart initial rotary movement to the cone, a pivotally mounted transmission shaft, a gear wheel loosely mounted thereon, and means for moving the transmission shaft to bring the gear wheel thereon to intermesh with various stepped portions of the two cones.

4. A double cone transmission gear mechanism comprising a driven and a driving shaft, a speed cone fixed to the driven shaft and a loosely mounted cone upon the driving shaft, a collar fixed to the driving shaft, a spring-pressed member pivotally mounted thereon, a clutch member for engagement with said pivotal member, the latter being adapted to engage a recess in the cone upon the driving shaft, means for moving the cone upon the driving shaft in frictional contact with said collar to impart initial rotary movement to the cone, a pivotally mounted transmission shaft, a gear wheel loosely mounted thereon, means for moving the transmission shaft to bring the gear wheel thereon to intermesh with various stepped portions of the two cones, and means for holding the transmission shaft in different adjusted positions.

5. A double cone transmission gear mechanism comprising a driven and a driving shaft, a speed cone fixed to the driven shaft and a loosely mounted cone upon the driving shaft, a collar fixed to the driving shaft, a spring-pressed member pivotally mounted thereon, a clutch member for engagement with said pivotal member, the latter being adapted to engage a recess in the cone upon the driving shaft, means for moving the cone upon the driving shaft in frictional contact with said collar to impart initial rotary movement to the cone, a pivotally mounted transmission shaft, a gear wheel loosely mounted thereon, means for moving the transmission shaft to bring the gear wheel thereon to intermesh with various stepped portions of the two cones, a grooved member positioned in diagonal relation to the transmission shaft and adapted to receive the latter, and means for holding the transmission shaft in an adjusted position.

6. A double cone transmission gear mechanism comprising a driven and a driving shaft, a speed cone fixed to the driven shaft and a loosely mounted cone upon the driving shaft, a collar fixed to the driving shaft, a spring-pressed member pivotally mounted thereon, a clutch member for engagement with said pivotal member, the latter being adapted to engage a recess in the cone upon the driving shaft, means for moving the cone upon the driving shaft in frictional contact with said collar to impart initial rotary movement to the cone, a pivotally mounted transmission shaft, a gear wheel loosely mounted thereon, means for moving the transmission shaft to bring the gear wheel thereon to intermesh with various stepped portions of the two cones, a grooved member positioned in diagonal relation to the transmission shaft and adapted to receive the latter, and a bar mounted over the grooved member and adapted to hold the transmission shaft in one or the other of the grooves thereon.

7. A double cone transmission gear mechanism comprising a driven and a driving shaft, a speed cone fixed to the driven shaft and a loosely mounted cone upon the driving shaft, a collar fixed to the driving shaft, a spring-pressed angle lever pivoted upon said collar, a clutch member with one end hollowed and provided with a conical-shaped wall for engagement with one end of the angle lever, a lever for moving the clutch collar, a hand wheel upon the driving shaft having a threaded hub portion, a shell interiorly threaded to receive said threaded portion of the hub of the hand wheel, the latter being adapted to bear frictionally against the cone upon the driving shaft to move the same into frictional contact with said collar, a pivotally mounted transmission shaft, and a gear wheel loosely mounted thereon and adapted to be moved into mesh with the various stepped portions of the cones.

8. A double cone transmission gear mechanism comprising a driven and a driving shaft, a speed cone fixed to the driven shaft and a loosely mounted cone upon the driving shaft, a collar fixed to the driving shaft, a spring-pressed angle lever pivoted upon said collar, a clutch member with one end hollowed and provided with a conical-shaped wall for engagement with one end of the angle lever, a lever for moving the clutch collar, a hand wheel upon the driving shaft having a threaded hub portion, a shell interiorly threaded to receive said threaded portion of the hub of the hand wheel, the latter being adapted to bear frictionally against the cone upon the driving shaft to move the same into frictional contact with said collar, a movable transmission shaft, and means for guiding the latter as it is moved to different adjusted positions, a gear wheel loosely journaled upon the transmission shaft, and means for holding the latter in different adjusted positions.

In testimony whereof I hereunto affix my signature in presence of two witnesses.

ELMER F. BUBB.

Witnesses:
DAVID L. JOHNSON,
HELGE AL. JOHNSON.

Copies of this patent may be obtained for five cents each, by addressing the "Commissioner of Patents, Washington, D. C."